United States Patent
Suzuki et al.

(10) Patent No.: US 6,643,463 B1
(45) Date of Patent: Nov. 4, 2003

(54) OPTICAL WAVELENGTH DIVISION MULTIPLEXING TRANSMISSION NETWORK SYSTEM USING TRANSMITTING/RECEIVING APPARATUSES HAVING 2-INPUT AND 2-OUTPUT OPTICAL PATH SWITCHING ELEMENTS

(75) Inventors: Senichi Suzuki, Mito (JP); Masao Kawachi, Mito (JP); Kennosuke Fukami, Atsugi (JP); Yuji Akatsu, Atsugi (JP); Kazutosi Kato, Isehara (JP); Mitsuru Harada, Isehara (JP); Junichi Akahani, Nara (JP); Atsushi Takahara, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/581,998
(22) PCT Filed: Oct. 26, 1999
(86) PCT No.: PCT/JP99/05891
§ 371 (c)(1),
(2), (4) Date: Jun. 21, 2000
(87) PCT Pub. No.: WO00/25457
PCT Pub. Date: May 4, 2000

(30) Foreign Application Priority Data

Oct. 26, 1998 (JP) ........................................... 10-304571

(51) Int. Cl.[7] ............................................... H04J 14/02
(52) U.S. Cl. .............................. 398/49; 398/68; 398/87
(58) Field of Search ......................................... 359/128

(56) References Cited

U.S. PATENT DOCUMENTS 5,699,177 A 12/1997 Yamamoto
5,754,320 A * 5/1998 Watanabe et al. ............. 398/50
6,243,178 B1 * 6/2001 Suemura et al. .............. 398/56
6,404,525 B1 * 6/2002 Shimomura et al. .......... 398/82
6,519,062 B1 * 2/2003 Yoo ............................. 398/49

FOREIGN PATENT DOCUMENTS

| AU | 60668/94 | 11/1994 |
|---|---|---|
| CA | 2121955 | 4/1994 |
| EP | 621700 | 10/1994 |
| JP | 6232843 | 8/1994 |

(List continued on next page.)

Primary Examiner—Leslie Pascal
(74) Attorney, Agent, or Firm—Thelen Reid & Priest LLP; Robert E. Krebs

(57) ABSTRACT

An optical wavelength division multiplexing transmission network system having a star-topology network is disclosed, which comprises an arrayed-waveguide grating type multiplexing/demultiplexing circuit having N input ports and N output ports, and N transmitting/receiving apparatuses, each apparatus including a transmitter, receiver, demultiplexer, multiplexer, and N 2-input and 2-output optical path switching elements corresponding to N wavelengths, so as to cope with a damage to a transmitting or receiving portion corresponding to a specific wavelength. Each switching element is independently switched between first and second connective conditions. In the first connective condition, the output port corresponding to a specific wavelength of the demultiplexer is connected to the input port corresponding to the specific wavelength of the receiver, and the output port corresponding to a specific wavelength of the transmitter is connected to the input port corresponding to the specific wavelength of the multiplexer; and in the second connective condition, the output port corresponding to a specific wavelength of the transmitter is connected to the input port corresponding to the specific wavelength of the receiver, and the output port corresponding to a specific wavelength of the demultiplexer is connected to the input port corresponding to the specific wavelength of the multiplexer.

4 Claims, 7 Drawing Sheets

FOREIGN PATENT DOCUMENTS

| | | |
|---|---|---|
| JP | 6311139 | 11/1994 |
| JP | 7095178 | 4/1995 |
| JP | 08195718 | 7/1996 |
| JP | 63062424 | 3/1998 |
| JP | 10210014 | 8/1998 |
| WO | WO 00/25457 | 5/2000 |

* cited by examiner

FIG. 2

| TRANSMITTING -SIDE APPARATUS | RECEIVING-SIDE APPARATUS / INPUT OF AWG \ OUTPUT OF AWG | 1 | 2 | 3 | 4 | 5 | 6 | 7 | 8 |
|---|---|---|---|---|---|---|---|---|---|
| | | 1 | 8 | $\lambda_5$ | $\lambda_6$ | $\lambda_7$ | $\lambda_8$ | $\lambda_1$ | $\lambda_2$ | $\lambda_3$ | $\lambda_4$ |
| | | 2 | 7 | $\lambda_4$ | $\lambda_5$ | $\lambda_6$ | $\lambda_7$ | $\lambda_8$ | $\lambda_1$ | $\lambda_2$ | $\lambda_3$ |
| | | 3 | 6 | $\lambda_3$ | $\lambda_4$ | $\lambda_5$ | $\lambda_6$ | $\lambda_7$ | $\lambda_8$ | $\lambda_1$ | $\lambda_2$ |
| | | 4 | 5 | $\lambda_2$ | $\lambda_3$ | $\lambda_4$ | $\lambda_5$ | $\lambda_6$ | $\lambda_7$ | $\lambda_8$ | $\lambda_1$ |
| | | 5 | 4 | $\lambda_1$ | $\lambda_2$ | $\lambda_3$ | $\lambda_4$ | $\lambda_5$ | $\lambda_6$ | $\lambda_7$ | $\lambda_8$ |
| | | 6 | 3 | $\lambda_8$ | $\lambda_1$ | $\lambda_2$ | $\lambda_3$ | $\lambda_4$ | $\lambda_5$ | $\lambda_6$ | $\lambda_7$ |
| | | 7 | 2 | $\lambda_7$ | $\lambda_8$ | $\lambda_1$ | $\lambda_2$ | $\lambda_3$ | $\lambda_4$ | $\lambda_5$ | $\lambda_6$ |
| | | 8 | 1 | $\lambda_6$ | $\lambda_7$ | $\lambda_8$ | $\lambda_1$ | $\lambda_2$ | $\lambda_3$ | $\lambda_4$ | $\lambda_5$ |

(Note: The leftmost two columns list transmitting-side apparatus numbers 1–8 and corresponding input/output values.)

FIG. 6

| Transmitting-side apparatus \ Receiving-side apparatus | Output of AWG | 1 | 2 | 3 | 4 | 5 | 6 | 7 | 8 |
|---|---|---|---|---|---|---|---|---|---|
| Input of AWG | | 1 | 2 | 3 | 4 | 5 | 6 | 7 | 8 |
| 1 | 1 | $\lambda_6$ | $\lambda_7$ | $\lambda_8$ | $\lambda_1$ | $\lambda_2$ | $\lambda_3$ | $\lambda_4$ | $\lambda_5$ |
| 2 | 2 | $\lambda_7$ | $\lambda_8$ | $\lambda_1$ | $\lambda_2$ | $\lambda_3$ | $\lambda_4$ | $\lambda_5$ | $\lambda_6$ |
| 3 | 3 | $\lambda_8$ | $\lambda_1$ | $\lambda_2$ | $\lambda_3$ | $\lambda_4$ | $\lambda_5$ | $\lambda_6$ | $\lambda_7$ |
| 4 | 4 | $\lambda_1$ | $\lambda_2$ | $\lambda_3$ | $\lambda_4$ | $\lambda_5$ | $\lambda_6$ | $\lambda_7$ | $\lambda_8$ |
| 5 | 5 | $\lambda_2$ | $\lambda_3$ | $\lambda_4$ | $\lambda_5$ | $\lambda_6$ | $\lambda_7$ | $\lambda_8$ | $\lambda_1$ |
| 6 | 6 | $\lambda_3$ | $\lambda_4$ | $\lambda_5$ | $\lambda_6$ | $\lambda_7$ | $\lambda_8$ | $\lambda_1$ | $\lambda_2$ |
| 7 | 7 | $\lambda_4$ | $\lambda_5$ | $\lambda_6$ | $\lambda_7$ | $\lambda_8$ | $\lambda_1$ | $\lambda_2$ | $\lambda_3$ |
| 8 | 8 | $\lambda_5$ | $\lambda_6$ | $\lambda_7$ | $\lambda_8$ | $\lambda_1$ | $\lambda_2$ | $\lambda_3$ | $\lambda_4$ |

…

OPTICAL WAVELENGTH DIVISION MULTIPLEXING TRANSMISSION NETWORK SYSTEM USING TRANSMITTING/RECEIVING APPARATUSES HAVING 2-INPUT AND 2-OUTPUT OPTICAL PATH SWITCHING ELEMENTS

This application is a 371 of PCT/JP99/05891 which was filed on Oct. 26, 1999.

TECHNICAL FIELD

The present invention relates to a full-mesh optical wavelength division multiplexing transmission network system for transmitting a plurality of wavelength-multiplexed optical signals between a plurality of transmitting/receiving apparatuses.

BACKGROUND ART

In an optical wavelength division multiplexing (WDM) transmission system for transmitting a plurality of optical signals through a single optical fiber by assigning different wavelengths to each optical signal, it is possible not only to remarkably increase the capacity of the transmission path, but also to perform the "wavelength-addressing" operation in which information about the addressee of the relevant signal corresponds to each wavelength itself.

A star-topology WDM system includes an arrayed-waveguide grating type multiplexing/demultiplexing circuit (or arrayed-waveguide grating type multi/demultiplexer) in the center of the system, where this multiplexing/demultiplexing circuit has a wavelength response having a cyclic input/output relationship, and makes it possible to connect N transmitting/receiving apparatuses with each other. According to such a star-type WDM system, it is possible to realize a full-mesh WDM transmission network system only by using optical signals of N wavelengths, in which each of N×N signal paths for connecting the apparatuses with each other can be independently connected.

FIG. 4 is a schematic diagram showing the structure of a conventional full-mesh WDM transmission network system.

In the figure, reference numerals 1 to 7 indicate the 1st to Nth transmitting/receiving apparatuses (the 7th to (N−1)th apparatuses are not shown) for transmitting and receiving a WDM (wavelength-division-multiplexed) signal (of wavelengths $\lambda_1$ to $\lambda_n$), reference numeral 8 indicates an N×N arrayed-waveguide grating type multiplexing/demultiplexing circuit (AWG) having N input and N output ports and having a wavelength response which has a cyclic input/output relationship.

FIG. 5 is a diagram showing the general structure of the full-mesh WDM transmission network system in FIG. 4.

In FIG. 5, reference numerals 9 to 12 indicate the 1st to Nth transmitting/receiving apparatuses (the ith apparatus indicates any of the omitted apparatuses in the figure), reference numeral 13 indicates a receiver for receiving a WDM signal (of wavelengths $\lambda_1$ to $\lambda_n$), reference numeral 14 indicates a transmitter for transmitting a WDM signal (of wavelengths $\lambda_1$ to $\lambda_n$), reference numeral 15 indicates a demultiplexer for demultiplexing a WDM signal transmitted through a single optical fiber, reference numeral 16 indicates a multiplexer for multiplexing a plurality of optical signals having different wavelengths transmitted from the transmitter 14 so as to transmit a signal through a single optical fiber, reference numeral 17 indicates an N×N arrayed-waveguide grating type multiplexing/demultiplexing circuit (AWG), and reference numerals 18 to 21 indicate optical fibers for optically connecting the transmitting/receiving apparatuses 9 to 12 and the input and output ports of AWG 17. Here, the structure of each transmitting/receiving apparatus (10 to 12) is the same as the transmitting/receiving apparatus 9.

FIG. 6 is a diagram showing the wavelength response having a cyclic input/output relationship, and the connection relationship between the transmitting/receiving apparatuses and the AWG ports in the conventional full-mesh WDM transmission network system. For a simple explanation, the case using an 8×8 AWG is shown in FIG. 6.

Between 8 input ports and 8 output ports of the AWG, (8×8=) 64 paths can be established; however, the cyclic characteristic as shown in FIG. 6 makes it possible to independently establish 64 paths using the minimum 8 wavelengths. The above input and output ports of the AWG are connected to each relevant transmitting/receiving apparatus, so that each signal can be independently transmitted via any possible path between the eight transmitting/receiving apparatuses. Here, a specific wavelength $\lambda_i$ is assigned to each path. Therefore, it is possible to perform the wavelength addressing operation in which when the wavelength corresponding to a target receiver is selected at the transmitter side, a signal is automatically transmitted to the target receiver.

FIG. 7 is a diagram for explaining the wavelength addressing operation. In the figure, reference numerals 22 to 29 indicate 8 transmitting/receiving apparatuses, and reference numeral 30 indicates an 8×8 AWG. The wavelength response of the AWG and the connection relationship between the AWG ports and each transmitting/receiving apparatus are the same as those shown in FIG. 6.

The optical signal of wavelength $\lambda_7$ transmitted from the 1st transmitting/receiving apparatus 22 is introduced to input port 1 of AWG 30, and is output from output port 2 to the 2nd transmitting/receiving apparatus by switching the optical signal in the AWG 30 according to its wavelength. Similarly, the response signal of wavelength $\lambda_7$ transmitted from the 2nd transmitting/receiving apparatus 23 is transmitted to the 1st transmitting/receiving apparatus 22 via AWG 30. In addition, the optical signals having wavelengths $\lambda_2$ and $\lambda_8$ are respectively and automatically transmitted to the 5th transmitting/receiving apparatus 26 and the 3rd transmitting/receiving apparatus 24.

However, in the above conventional full-mesh WDM transmission network system, the addressee of the target signal one-to-one corresponds to a wavelength; therefore, if the transmitter relating to the relevant wavelength or the semiconductor laser used as a light source is damaged, a signal cannot be transmitted to a target receiver. Also if the receiver relating to the relevant wavelength is damaged, a similar problem occurs. These problems are serious for suitably operating and managing the system. Furthermore, in a conventional system, it is impossible to temporarily increase the transmission capacity between specific transmitting/receiving apparatuses.

DISCLOSURE OF THE INVENTION

In consideration of the above problems, an objective of the present invention is to provide a full-mesh optical wavelength division multiplexing transmission network system for suitably coping with a damaged transmitter or receiver corresponding to a specific wavelength, and for temporarily increasing the transmission capacity between specific transmitting/receiving apparatuses in case of need.

To achieve the above objective, the present invention provides an optical wavelength division multiplexing transmission network system comprising:

an arrayed-waveguide grating type multiplexing/demultiplexing circuit having N input ports and N output ports, where N is a plural number; and N transmitting/receiving apparatuses, each apparatus being optically connected to a predetermined input port and a predetermined output port of the arrayed-waveguide grating type multiplexing/demultiplexing circuit, wherein:

the arrayed-waveguide grating type multiplexing/demultiplexing circuit has a wavelength response having a cyclic input/output relationship; and each transmitting/receiving apparatus comprises:

a demultiplexer for demultiplexing an optical signal input from the predetermined output port of the arrayed-waveguide grating type multiplexing/demultiplexing circuit into signals of N wavelengths, and respectively outputting the demultiplexed optical signals from N output ports;

a transmitter for respectively transmitting optical signals of N wavelengths from N output ports;

a receiver for respectively receiving optical signals of N wavelengths from N input ports;

a multiplexer for multiplexing optical signals of N wavelengths input from N input ports, and outputting the multiplexed signal to the predetermined input port of the arrayed-waveguide grating type multiplexing/demultiplexing circuit; and N 2-input and 2-output optical path switching elements corresponding to N wavelengths, each switching element being independently switched between first and second connective conditions, wherein:

in the first connective condition, the output port corresponding to a specific wavelength of the demultiplexer is connected to the input port corresponding to the specific wavelength of the receiver, and the output port corresponding to a specific wavelength of the transmitter is connected to the input port corresponding to the specific wavelength of the multiplexer; and in the second connective condition, the output port corresponding to a specific wavelength of the transmitter is connected to the input port corresponding to the specific wavelength of the receiver, and the output port corresponding to a specific wavelength of the demultiplexer is connected to the input port corresponding to the specific wavelength of the multiplexer.

According to the present invention, an optical signal transmitted to the demultiplexer of a relevant transmitting/receiving apparatus via the switching operation of the arrayed-waveguide grating type multiplexing/demultiplexing circuit according to the wavelength of the optical signal can be returned by using the relevant 2-input and 2-output optical path switching element in the transmitting/receiving apparatus so that the returned signal is transmitted via the multiplexer to the arrayed-waveguide grating type multiplexing/demultiplexing circuit again. This optical signal is re-switched in the arrayed-waveguide grating type multiplexing/demultiplexing circuit according to the wavelength, and is transmitted to another transmitting/receiving apparatus.

That is, when an optical signal is transmitted from the transmitter of one of the transmitting/receiving apparatuses to (the receiver of) a target transmitting/receiving apparatus (i.e., addressee), even if the transmitting or receiving portion corresponding to the relevant Wavelength is damaged, an optical signal can be bypassed and transmitted to the target receiver by (repeatedly) performing the signal-returning operation as explained above.

In addition, according to the above structure, a plurality of signal paths can be temporarily established between specific transmitting/receiving apparatuses by switching the connective condition of each 2-input and 2-output optical path switching element, thereby temporarily increasing the transmission capacity.

As a preferable example, in the connection between the arrayed-waveguide grating type multiplexing/demultiplexing circuit and the transmitting/receiving apparatuses, the ith input port and the (N−i+1)th output port of the arrayed-waveguide grating type multiplexing/demultiplexing circuit are respectively connected to the multiplexer and the demultiplexer of the ith transmitting/receiving apparatus via an optical fiber, where i is an integer from 1 to N.

In addition, each of the N 2-input and 2-output optical path switching elements may be a thermo-optic switch using the thermo-optic effect of a silica-based planar lightwave circuit.

BRIEF DESCRIPTION OF THE DRAWINGS

FIG. 2 is a diagram showing the wavelength response which has a cyclic input/output relationship of the AWG and the connection relationship between the transmitting/receiving apparatuses and the ports of the AWG in the embodiment.

FIG. 6 is a diagram showing the wavelength response having a cyclic input/output relationship, and the connection relationship between the transmitting/receiving apparatuses and the AWG ports in the conventional system.

MODES FOR CARRYING OUT THE INVENTION

Hereinbelow, preferred embodiments of the present invention will be explained with reference to the drawings.

Figure 1:
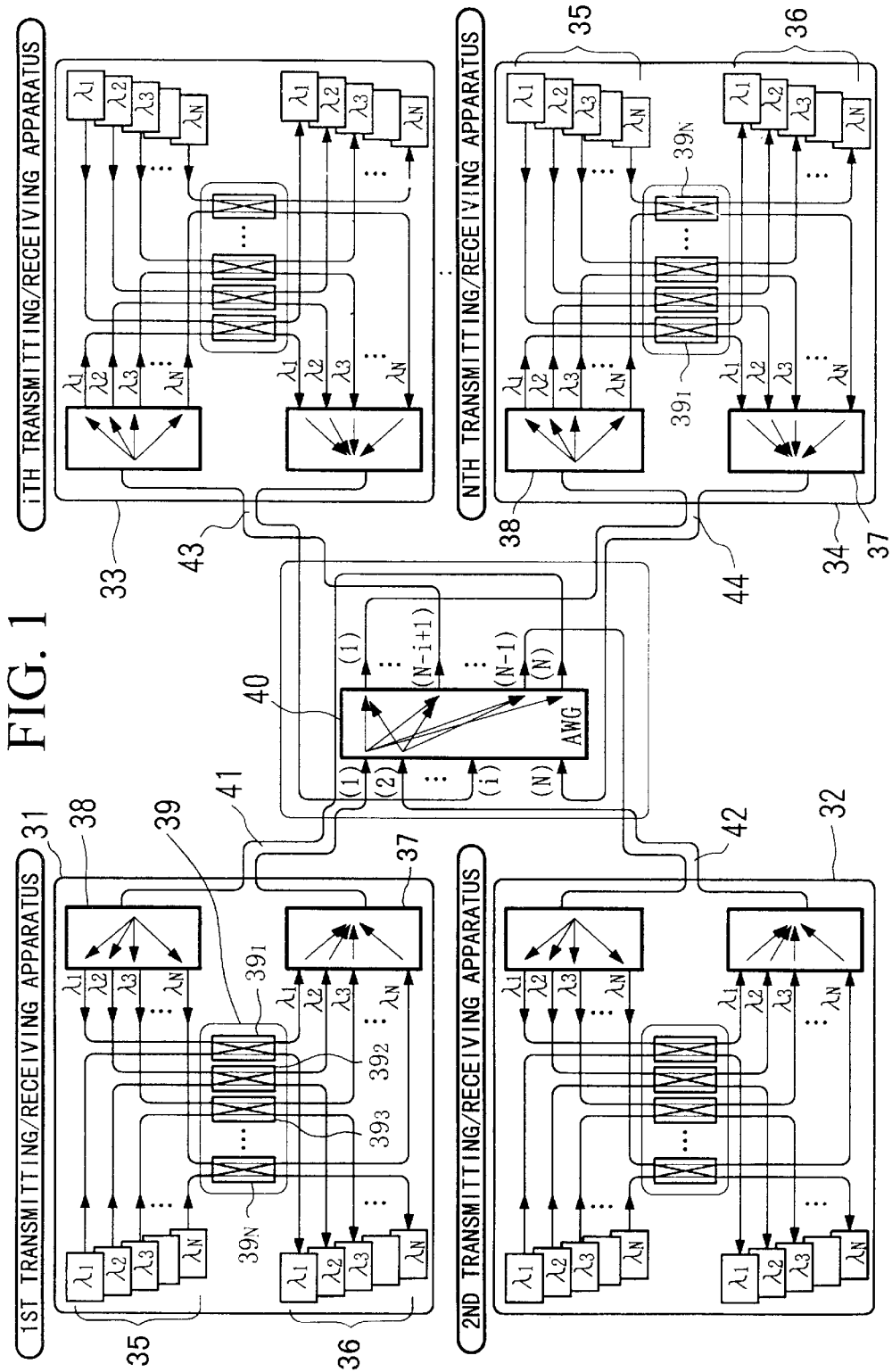
FIG. 1 is a diagram showing the general structure of an embodiment of the optical wavelength division multiplexing transmission network system according to the present invention.

FIG. 1 is a diagram showing of an embodiment of the general structure of the optical wavelength division multiplexing (WDM) network system according to the present invention.

In FIG. 1, reference numerals 31 to 34 indicate the 1st to Nth transmitting/receiving apparatuses (the ith apparatus indicates any of the omitted apparatuses in the figure), reference numeral 35 indicates a transmitter for transmitting a WDM (wavelength-division-multiplexed) signal (of wavelengths $\lambda_1$ to $\lambda_n$), reference numeral 36 indicates a receiver for receiving a WDM signal (of wavelengths $\lambda_1$ to $\lambda_n$), reference numeral 37 indicates a multiplexer for multiplexing a plurality of optical signals having different wavelengths so as to make a signal transmitted through a single optical fiber, reference numeral 38 indicates a demultiplexer for demultiplexing a WDM signal transmitted through a single optical fiber, reference numeral 39 indicates a switching section including N switches, that is, 2-input and 2-output optical path switching elements $39_1$ to $39_N$, for switching and supplying optical signals from the transmitter 35 and optical signals from the demultiplexer 38 to the receiver 36 and multiplexer 37, reference numeral 40 indicates an N×N arrayed-waveguide grating type multiplexing/demultiplexing circuit (AWG), and reference numerals 41 to 44 indicate optical fibers for optically connecting the transmitting/receiving apparatuses 31 to 34 and the input and output ports of AWG 40. Here, the structure of each of the 2nd to Nth transmitting/receiving apparatuses (32 to 34) is the same as the 1st transmitting/receiving apparatus 31.

In the present embodiment, a 1×N AWG is used for each of the multiplexer 37 and the demultiplexer 38, and each of the 2-input and 2-output optical path switching elements $39_1$ to $39_N$ is realized by using a 2×2 thermo-optic switch (TOSW) using the thermo-optic effect of a silica-based planar lightwave circuit (i.e., silica-based PLC).

When each 2×2 TOSW ($39_1$ to $39_N$) is operated in the cross mode, the optical signals from the transmitter 35 are introduced to the multiplexer 37 while the optical signals from the demultiplexer 38 are introduced to the receiver 36. Usually, the 2×2 TOSW is operated in this cross mode.

When each 2×2 TOSW is operated in the bar mode, the optical signals from the demultiplexer 38 are introduced to the multiplexer 37 so that the relevant signal is returned to optical fiber 41 connected to the AWG 40. In addition, the optical signals from the transmitter 35 are returned to the receiver 36 in the same transmitting/receiving apparatus.

The N 2×2 TOSWs ($39_1$ to $39_N$) respectively correspond to the different wavelengths of the WDM signal; thus, the mode of each switch can be independently set at any time. That is, in each 2×2 TOSW, the bar mode may be defined as the usual mode, and also in this case, similar effects according to the present invention can be obtained.

In the connection between the AWG 40 and the transmitting/receiving apparatuses 31 to 34, the ith input port (i is any integer from 1 to N) and the (N−i+1)th output port of AWG 40 are connected to the ith transmitting/receiving apparatus.

FIG. 2 is a diagram showing the wavelength response which has a cyclic input/output relationship of the AWG and the connection relationship between the transmitting/receiving apparatuses and the ports of the AWG of the full-mesh WDM transmission network system of the present embodiment, in case that N=8. The wavelength response of the AWG is the same as that of the conventional example shown in FIG. 6.

The connection relationship between each transmitting-side apparatus and the input ports of the AWG is also the same as that of the conventional example; however, the connection relationship between each receiving-side apparatus and the output ports of the AWG is different from the conventional case. In the present embodiment, each receiving-side apparatus i is connected to the (N−i+1)th output port (that is the (9−i)th output port, here).

Figure 3:
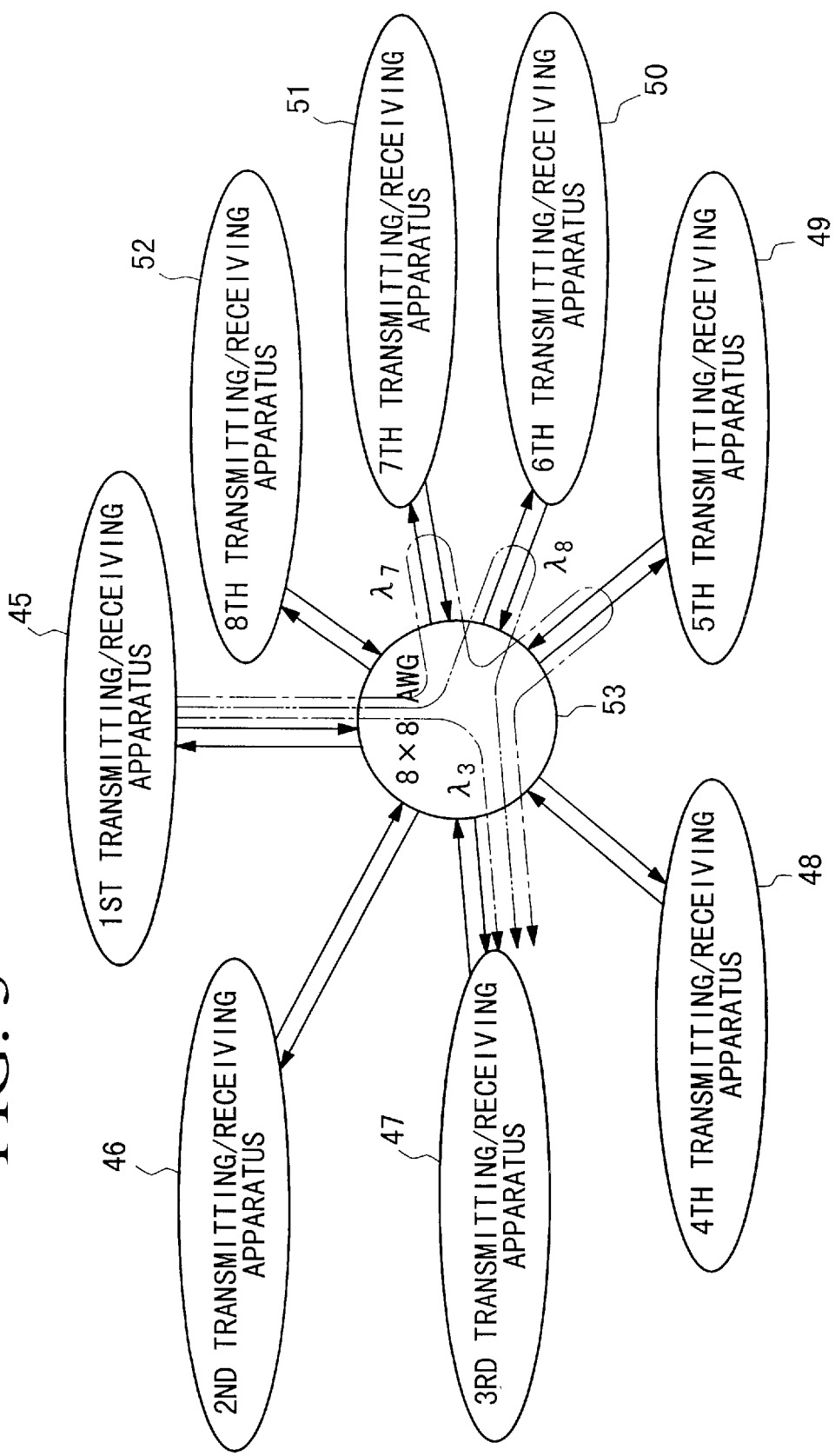
FIG. 3 is a diagram for explaining an operation example of the optical wavelength division multiplexing transmission network system in the embodiment.
Figure 4:
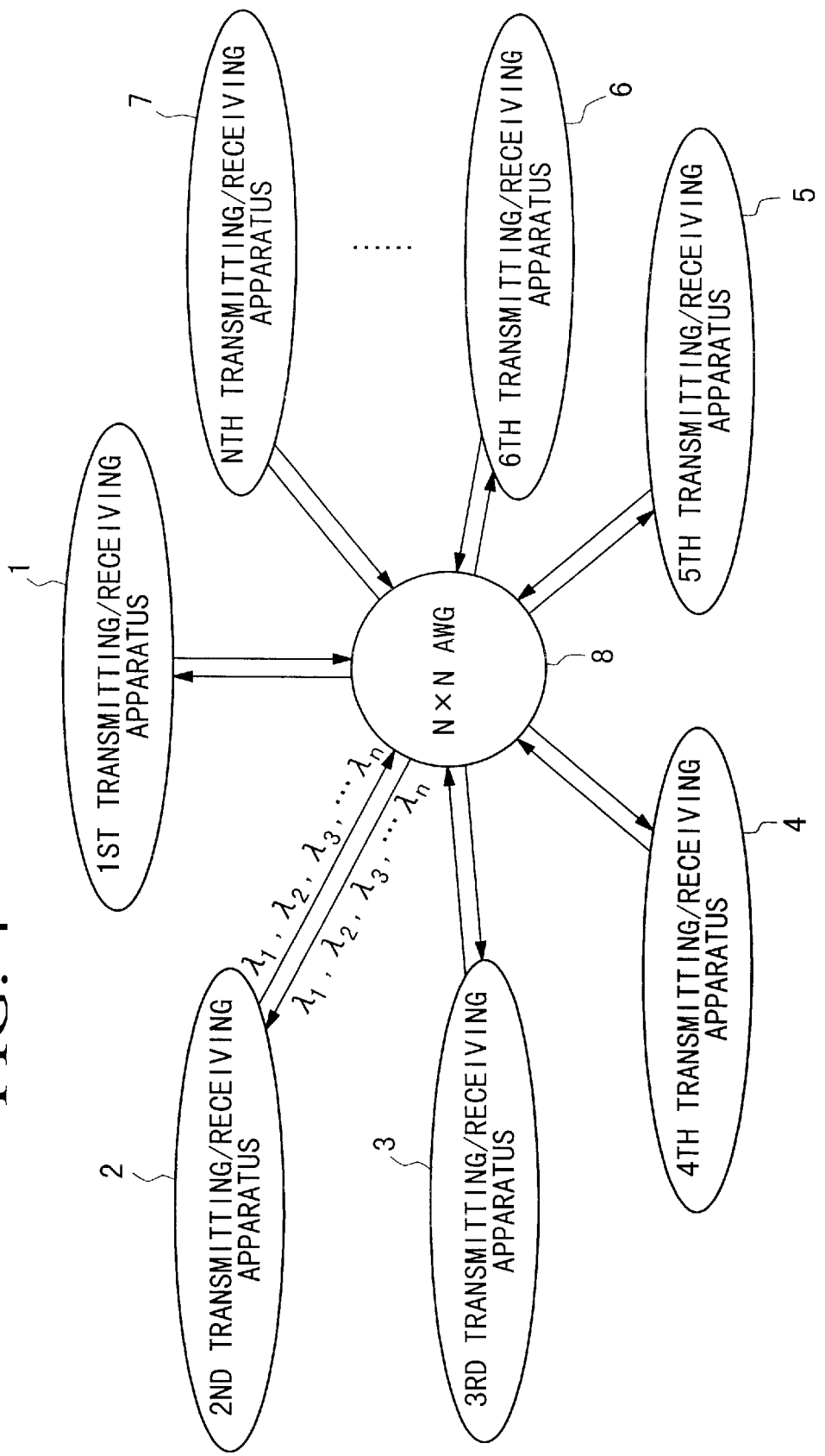
FIG. 4 is a schematic diagram showing the structure of a conventional full-mesh WDM transmission network system.
Figure 5:
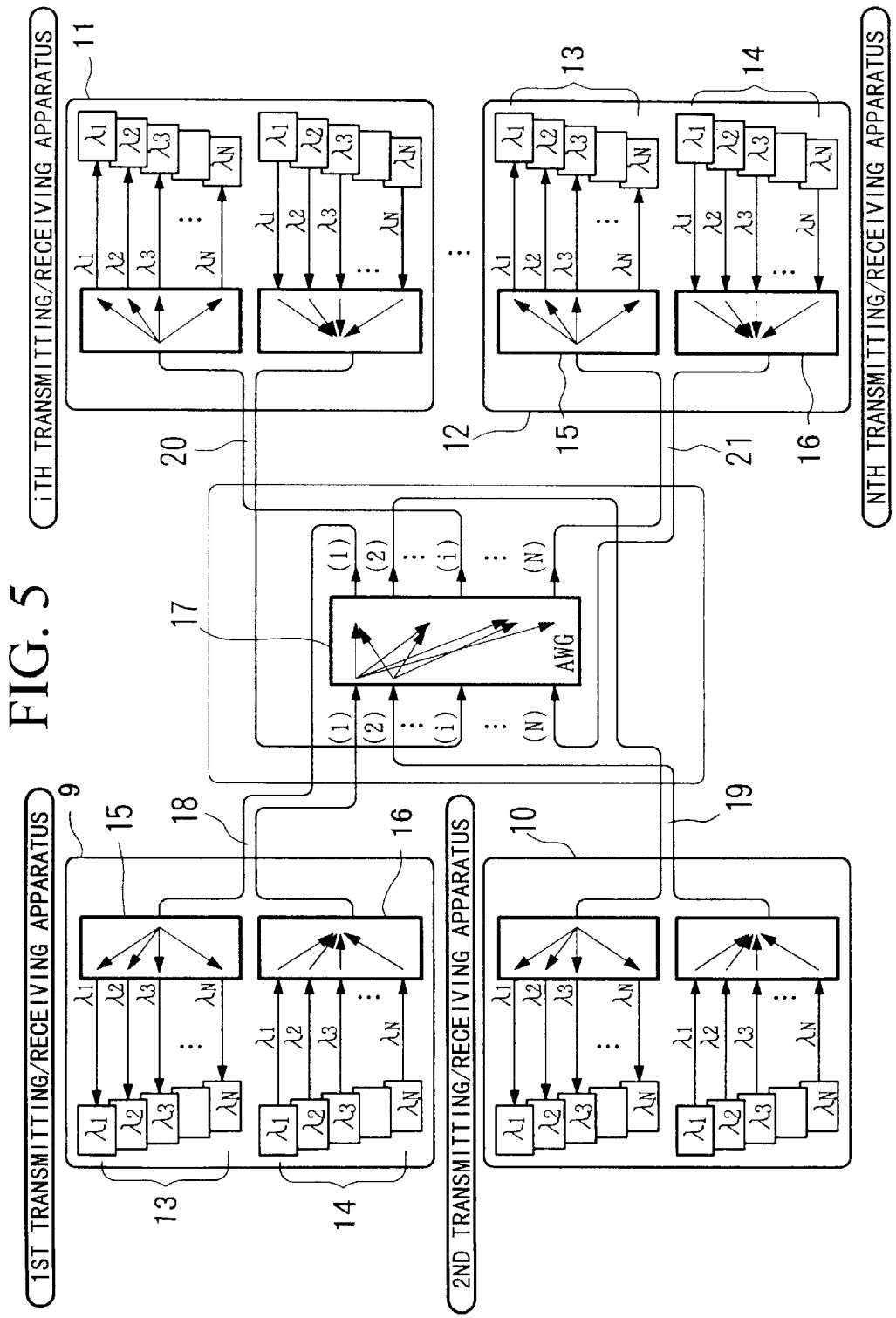
FIG. 5 is a diagram showing the general structure of the conventional full-mesh WDM transmission network system.
Figure 7:
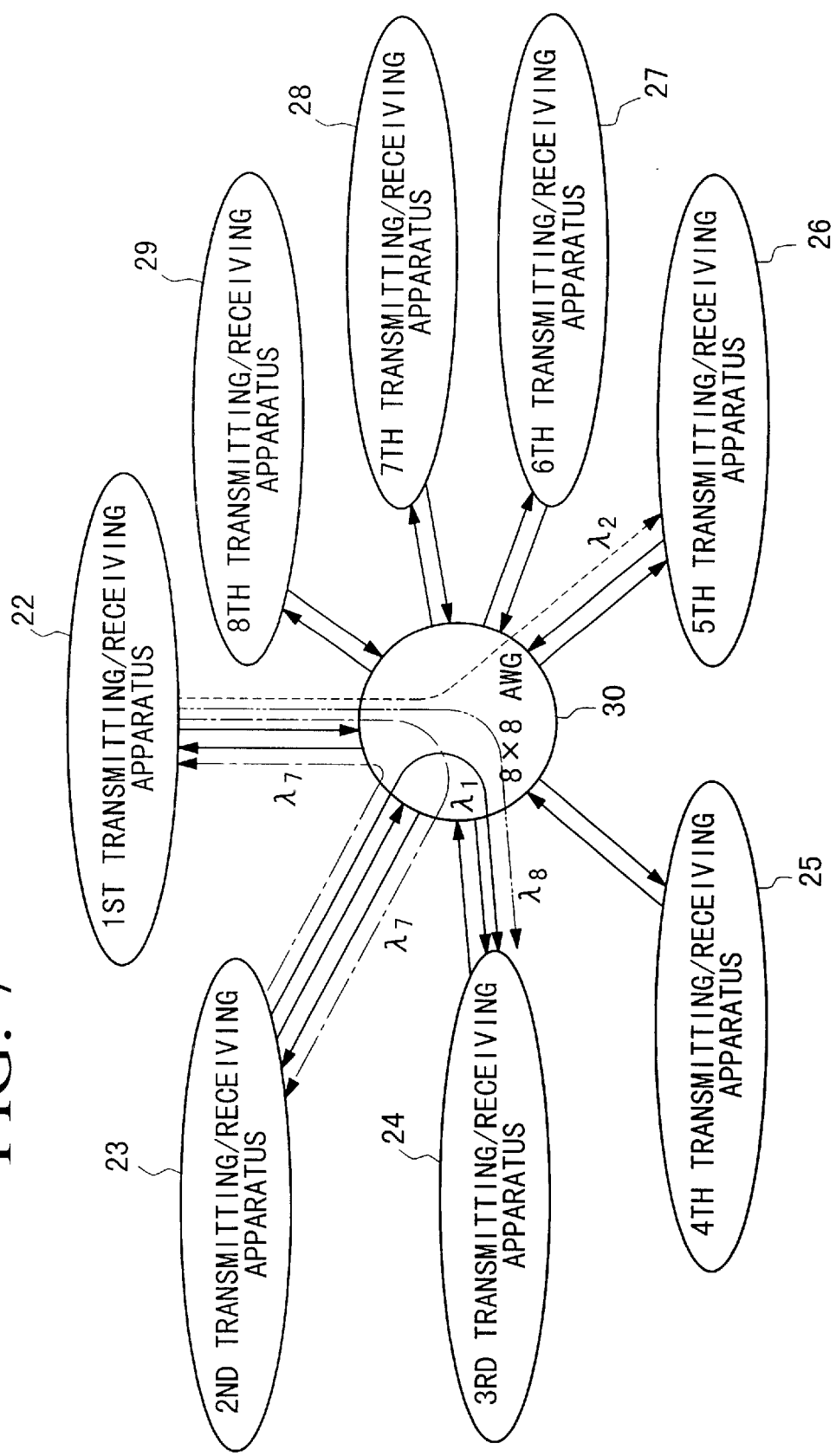
FIG. 7 is a diagram for explaining an operation example of the conventional optical wavelength division multiplexing transmission network system.

FIG. 3 is a diagram for explaining the operation of the present embodiment. In this figure, reference numerals 45 to 52 indicate the 1st to 8th transmitting/receiving apparatuses, and reference numeral 53 indicates an 8×8 AWG. Here, the number of each transmitting/receiving apparatus (45 to 52), the wavelength response of AWG 53, the connection relationship between the AWG ports and the transmitting/receiving apparatuses, and the like, are similar to those explained by using FIG. 2.

In the above structure, in order to transmit a signal from the 1st transmitting/receiving apparatus 45 to the 3rd transmitting/receiving apparatus 47, only by transmitting an optical signal of wavelength $\lambda_3$, the signal is automatically transmitted from the 1st transmitting/receiving apparatus 45 via AWG 53 to the 3rd transmitting/receiving apparatus 47 according to the wavelength response as shown in FIG. 2.

In this process, it is assumed that the transmitting portion for transmitting the optical signal of $\lambda_3$ of the 1st transmitting/receiving apparatus 45 is damaged and thus the optical signal $\lambda_3$ cannot be output from the apparatus 45. In this case, it is impossible to directly transmit a signal to the 3rd transmitting/receiving apparatus 47.

Therefore, among the 2×2 TOSWs $39_1$ to $39_N$ of the 6th transmitting/receiving apparatus 50, the connective condition of the 2×2 TOSW $39_8$ corresponding to wavelength $\lambda_8$ is switched from the cross mode (i.e., the usual mode) to the above-explained bar mode, so that the signal of wavelength $\lambda_8$, introduced to the 6th transmitting/receiving apparatus 50, is returned from this apparatus. Under this condition, when an optical signal of wavelength $\lambda_8$ is transmitted from the 1st transmitting/receiving apparatus 45, the signal is transmitted via AWG 53 to the 6th transmitting/receiving apparatus according to the wavelength response as shown in FIG. 2. In the 6th transmitting/receiving apparatus 50, the 2×2 TOSW is set in a manner such that the optical signal of wavelength $\lambda_8$ is returned. Therefore, the signal of wavelength $\lambda_8$ is transmitted from the 6th transmitting/receiving apparatus 50 to AWG 53 again, and the signal is further transmitted to the 3rd transmitting/receiving apparatus 47 according to the relationship as shown in FIG. 2.

As explained above, the signal transmission from the 1st transmitting/receiving apparatus 45 to the 3rd transmitting/receiving apparatus 47 can be performed via the 6th transmitting/receiving apparatus 50 by using wavelength $\lambda_8$ as substitute for wavelength $\lambda_3$.

In the above process, the optical signal is bypassed by not converting the optical signal to an electric signal; thus, no undesirable limitation is imposed on the speed of the signal transmission and the protocol.

Also in the 6th transmitting/receiving apparatus 50 in which the connection mode of the 2×2 TOSW $39_8$ is switched as explained above, the signals having wavelengths other than $\lambda_8$ can be transmitted with no problem.

In another example, the connective condition corresponding to wavelength $\lambda_7$ of the 2×2 TOSWs of the 5th transmitting/receiving apparatus 49 and the 7th transmitting/receiving apparatus 51 may be switched to the bar mode so as to return signals. Also in this case, the optical signal of wavelength $\lambda_7$, transmitted from the 1st transmitting/receiving apparatus 45, can be transmitted via the 7th transmitting/receiving apparatus 51 and the 5th transmitting/receiving apparatus 49 to the 3rd transmitting/receiving apparatus 47.

In the above explanation, it was assumed that the optical signal of wavelength $\lambda_3$ cannot be transmitted from the 1st transmitting/receiving apparatus 45, but the bypassing operation using wavelength $\lambda_8$ can be independently set and performed regardless of wavelength $\lambda_3$. Similarly, a plurality of optical signals can be simultaneously transmitted between the 1st transmitting/receiving apparatus 45 and the 3rd transmitting/receiving apparatus 47, thereby temporarily increasing the transmission capacity.

In addition, only the transmission path between the 1st transmitting/receiving apparatus 45 and the 3rd transmitting/receiving apparatus 47 was explained in the above embodiment. However, with reference to the relationship shown in FIG. 2, it is obvious that a similar transmission path can be established between other transmitting/receiving apparatuses.

Furthermore, the connection relationship (i.e., combination) between the AWG ports and the transmitting/receiving apparatuses is not limited to that shown in FIG. 2, but is it obvious that other connection relationships for realizing operations similar to those of the above embodiment can be used in the present invention.

What is claimed is:

1. An optical wavelength division multiplexing transmission network system comprising:

an arrayed-waveguide grating type multiplexing/demultiplexing circuit having N input ports and N output ports, where N is a plural number; and N transmitting/receiving apparatuses, each apparatus being optically connected to a predetermined input port and a predetermined output port of the arrayed-waveguide grating type multiplexing/demultiplexing circuit, wherein:

the arrayed-waveguide grating type multiplexing/demultiplexing circuit has a wavelength response having a cyclic input/output relationship; and each transmitting/receiving apparatus comprises:

a demultiplexer for demultiplexing an optical signal input from the predetermined output port of the arrayed-waveguide grating type multiplexing/demultiplexing circuit into signals of N wavelengths, and respectively outputting the demultiplexed optical signals from N output ports;

a transmitter for respectively transmitting optical signals of N wavelengths from N output ports;

a receiver for respectively receiving optical signals of N wavelengths from N input ports;

a multiplexer for multiplexing optical signals of N wavelengths input from N input ports, and outputting the multiplexed signal to the predetermined input port of the arrayed-waveguide grating type multiplexing/demultiplexing circuit; and N 2-input and 2-output optical path switching elements corresponding to N wavelengths, each switching element being independently switched between first and second connective conditions, wherein:

in the first connective condition, the output port corresponding to a specific wavelength of the demultiplexer is connected to the input port corresponding to the specific wavelength of the receiver, and the output port corresponding to a specific wavelength of the transmitter is connected to the input port corresponding to the specific wavelength of the multiplexer; and in the second connective condition, the output port corresponding to a specific wavelength of the transmitter is connected to the input port corresponding to the specific wavelength of the receiver, and the output port corresponding to a specific wavelength of the demultiplexer is connected to the input port corresponding to the specific wavelength of the multiplexer.

2. An optical wavelength division multiplexing transmission network system as claimed in claim 1, wherein in the connection between the arrayed-waveguide grating type multiplexing/demultiplexing circuit and the transmitting/receiving apparatuses, the ith input port and the (N−i+1)th output port of the arrayed-waveguide grating type multiplexing/demultiplexing circuit are respectively connected to the multiplexer and the demultiplexer of the ith transmitting/receiving apparatus via an optical fiber, where i is an integer from 1 to N.

3. An optical wavelength division multiplexing transmission network system as claimed in claim 2, wherein each of the N 2-input and 2-output optical path switching elements is a thermo-optic switch using the thermo-optic effect of a silica-based planar lightwave circuit.

4. An optical wavelength division multiplexing transmission network system as claimed in claim 1, wherein each of the N 2-input and 2-output optical path switching elements is a thermo-optic switch using the thermo-optic effect of a silica-based planar lightwave circuit.

\* \* \* \* \*